United States Patent [19]
Phillips et al.

[11] Patent Number: 5,035,907
[45] Date of Patent: Jul. 30, 1991

[54] METHOD OF MAKING AND USING AN ASSEMBLY FOR DECORATING PASTRIES

[75] Inventors: Charles A. Phillips; Mortimer D. Phillips, both of White Plains, N.Y.

[73] Assignee: Leonard Baking Co., Inc., Port Chester, N.Y.

[21] Appl. No.: 386,618

[22] Filed: Jul. 31, 1989

[51] Int. Cl.⁵ ............................................. A23G 3/00
[52] U.S. Cl. .................................. 426/383; 426/94; 426/420; 426/515; 426/389; 426/87; 426/396; 426/124; 426/571; 426/115
[58] Field of Search ............... 426/104, 87, 383, 420, 426/389, 515, 94, 396, 124, 571, 115

[56] References Cited

U.S. PATENT DOCUMENTS

| 1,788,493 | 1/1931 | Olscchewsky | 426/383 |
| 2,085,728 | 7/1937 | Clark | 426/104 |
| 2,610,588 | 9/1952 | Seagren et al. | 426/104 |
| 3,018,183 | 1/1962 | Downey | 426/571 |
| 3,490,920 | 1/1970 | Grettie et al. | 426/329 |
| 3,503,345 | 3/1970 | Abrams | 426/104 |
| 4,560,562 | 12/1985 | Schroeder | 426/87 |
| 4,670,271 | 6/1987 | Pasternak | 426/90 |

FOREIGN PATENT DOCUMENTS 422430 1/1935 United Kingdom ................. 426/383
630210 10/1949 United Kingdom .

OTHER PUBLICATIONS

Brochure entitled "Qwikie Cake Transfers", Bulletin #53, 1970–71, Seagran Products, Inc.

Primary Examiner—Steven Weinstein
Attorney, Agent, or Firm—Kirschstein, Ottinger, Israel & Schiffmiller

[57] ABSTRACT

A marshmallow-based, edible, sheet-like, decorative overlay is formed in situ on a release film mounted on a rigid carrier sheet. After peeling the release film and the overlay together from the carrier sheet, the release film is subsequently peeled from the overlay to enable the overlay to be transferred by itself to a pastry to decorate the same.

10 Claims, 4 Drawing Sheets

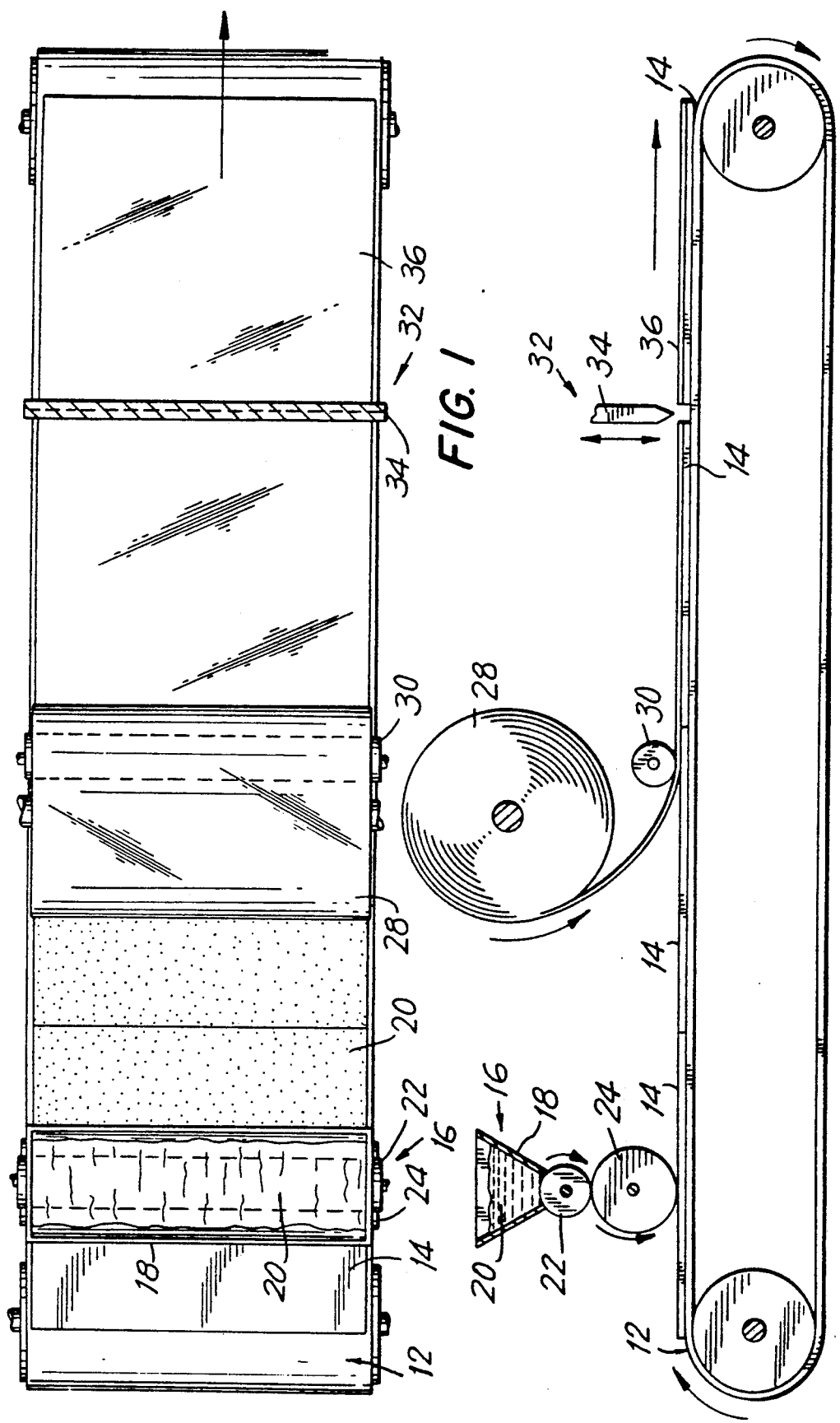

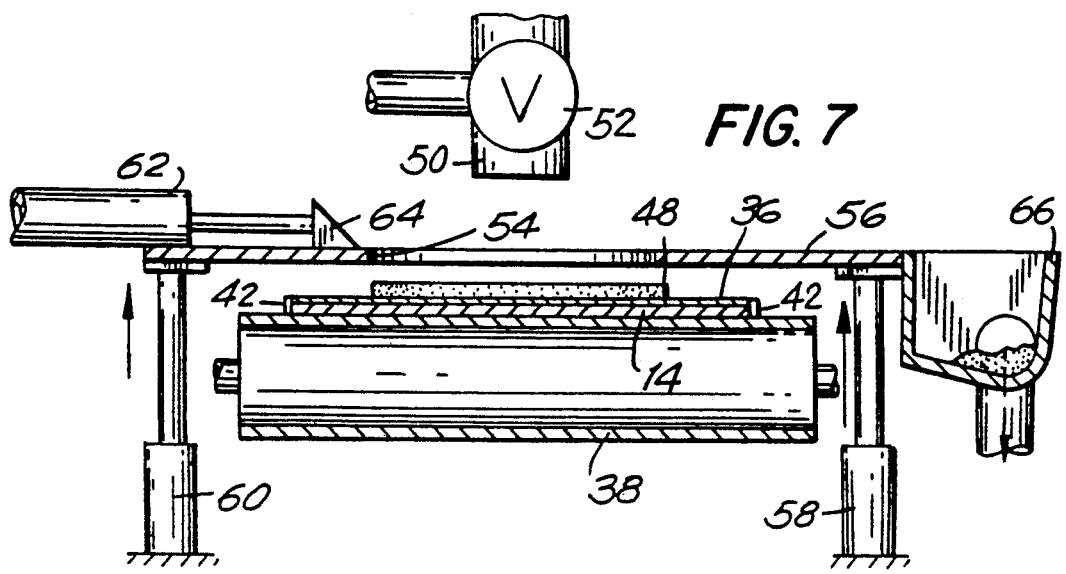
FIG. 7
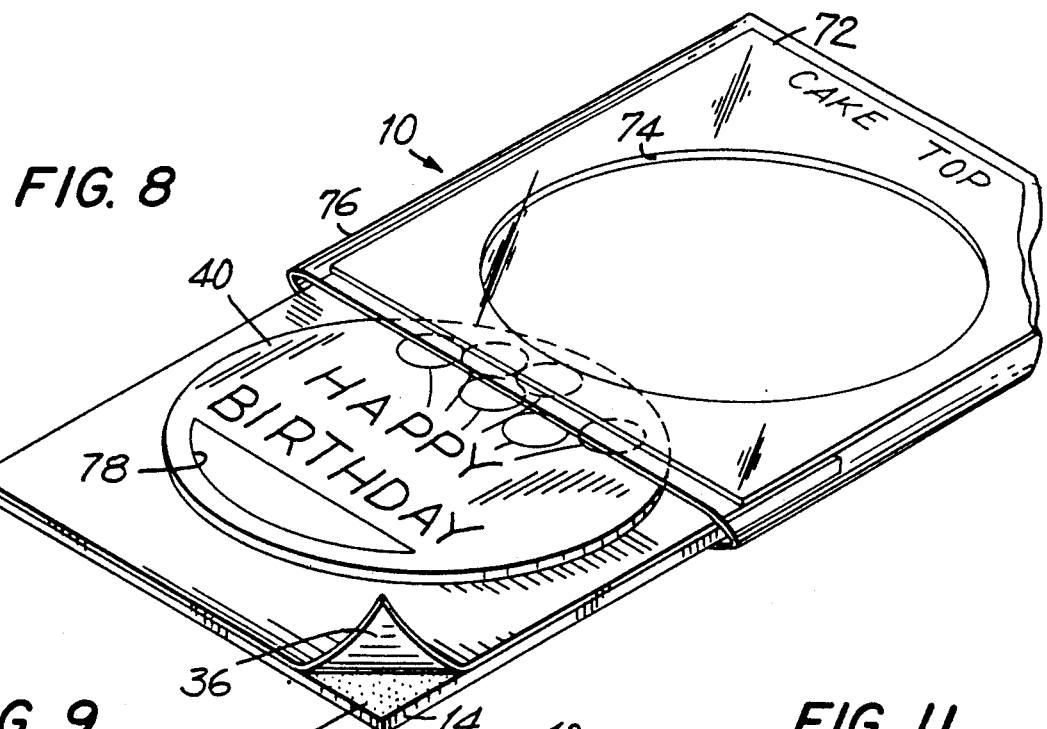
FIG. 8
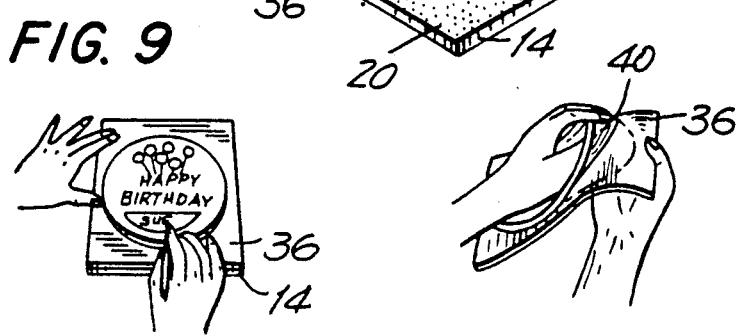
FIG. 9
FIG. 10
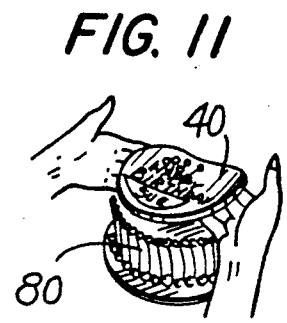
FIG. 11

METHOD OF MAKING AND USING AN ASSEMBLY FOR DECORATING PASTRIES

BACKGROUND OF THE INVENTION

1. Field of the Invention

This invention generally relates to making and using an assembly for decorating pastries and, more particularly, to edible decorative overlays transferrable to cakes and like foodstuffs for decorating the same.

2. Description of Related Art

It is already known, for example, from U.K. Patent No. 422,430, to make an edible decoration for ornamenting cakes and such foodstuffs as puddings, eggs, chocolates, sweets and biscuits, from a moldable, marshmallow-based mass which has been rolled out under pressure to form a sheet-like overlay. The overlay can be laid directly over a cake and, when imprinted with a suitable design, decorates the cake.

Experience has shown, however, that such known marshmallow-based edible overlays dry hard, become brittle and crack with age and during use, thereby making them unsuitable as a cake-top decoration. It is not uncommon for such overlays to be stored for many months on supermarket shelves or in one's home prior to use. Also, transport and handling of such overlays, particularly in large quantities, accelerates their cracking and unusability due to shock forces normally encountered during such transport and handling.

To resist such cracking of the overlay during transport and use, the prior art has proposed placing the overlay on an edible paper sheet such as rice paper or wafer paper, or between two such edible paper sheets. The resulting composite is then placed directly onto the top of the cake. However, many people do not want to eat rice paper or wafer paper as part of a cake, no matter how pretty the decorative overlay appears.

Still another proposal, according to the prior art, is to place the overlay on a discardable foam tray. The tray protects the overlay from those forces normally encountered during transport, and the overlay is thereupon removed from the tray just prior to use.

However, experience has shown that a marshmallow-based overlay is very sticky and adheres strongly to the tray. It is difficult to remove the overlay from the tray without cracking and otherwise damaging the overlay in the process. Attempts have been made to use vegetable oil between the tray and the overlay to promote removal of the overlay from the tray. However, aside from being messy and possibly compromising the flavor of the overlay, the use of vegetable oil must be controlled. Using too much vegetable oil causes the overlay not to stick to the tray, thereby causing the overlay to shift relative to the tray during manufacture as well as during transport. Using too little vegetable oil causes the overlay to aggressively stick to the tray, thereby preventing a user from easily removing the overlay from the tray. In either event, the overlay tends to be damaged and makes for an unsuitable cake-top decoration.

SUMMARY OF THE INVENTION

1. Objects of the Invention

It is a general object of this invention to advance the state of the art of pastry decorations.

It is another object of this invention to reliably prevent an edible sheet-like overlay from moving, shifting and otherwise falling off from a tray or analogous backing during manufacture, transport and handling while, at the same time, reliably enabling a user to easily remove the overlay from the backing prior to use as a pastry decoration.

Another object of this invention is to eliminate the use and need for making edible paper sheets, such as rice paper or wafer paper, as a backing for marshmallow-based sheet-like overlays.

A further object of this invention is to prevent a marshmallow-based overlay from drying hard, becoming brittle and cracking.

Still another object of this invention is to provide an attractive overlay for decorating pastries.

Yet another object of this invention is to provide a novel arrangement for and a novel method of making a multi-part assembly for use in decorating a pastry.

A still further object of this invention is to provide a novel decorative overlay for use in decorating a pastry.

2. Features of the Invention

In keeping with these objects, and others which will become apparent hereinafter, one feature of this invention resides, briefly stated, in an arrangement for and a method of making an assembly for use in decorating a pastry. The invention comprises a rigid carrier sheet; a flexible sheet-like release film mounted on the carrier sheet; and an edible, transferrable, hardenable, sheet-like, decorative overlay formed in situ on the release film. The overlay clings to the release film upon hardening of the overlay.

In accordance with this invention, the release film and the overlay clinging thereto are initially peeled together as a unit from the carrier sheet. Subsequently, the release film is peeled from the overlay to enable the overlay to be transferred by itself to the pastry to decorate the same.

According to the preferred embodiment, an adhesive layer is applied over an upper surface of the carrier sheet, and the release film is pressed over and in contact with such adhesive layer. Preferably, the adhesive layer is a water-based, non-toxic, food grade adhesive approved for indirect contact with food. The adhesive layer bond is easily overcome by a user exerting modest pulling force.

The overlay is formed from a marshmallow-based, heated, aerated and fluid mixture consisting essentially of water, gelatin, sugar, glycerine, corn syrup and icing sugar. The mixture is poured into a patterned aperture of a stencil initially positioned on the release film. The pouring overfills the aperture. Hence, excess fluid mixture must be scraped from the aperture. After elapse of a predetermined time sufficient to allow the fluid mixture to at least partially harden, the stencil is removed from the release film. The aperture may have any suitable pattern or shape.

Once the fluid mixture has at least partially hardened to form the overlay, a predetermined design, preferably of multiple colors, is printed on an upper surface of the hardened overlay with edible colored inks. Any design suitable for any occasion may be so printed. The printed overlay is thereupon placed in a package, preferably one having an opening through which the design is visible.

Thus, in accordance with this invention, the overlay is protected during manufacture, transport and handling by the rigid nature of the carrier sheet. No edible paper sheets are required. The provision of glycerine within the marshmallow-based mixture prevents the overlay from drying hard, becoming brittle or cracking over a shelf life at least exceeding two years.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a top plan view of an upstream section of a production line operative for making an assembly for use in decorating a pastry according to the method of this invention;

FIG. 2 is a side view of the arrangement of FIG. 1;

FIG. 7 is a view analogous to FIG. 6, but at a still later stage of forming the overlay on the release film;

FIG. 8 is a partly broken-away front perspective view showing the completed assembly partially removed from a wrapper;

FIG. 9 is a front perspective view of the assembly being personalized prior to transfer onto a cake top;

FIG. 10 is a front perspective view depicting the peeling of the release film from the overlay immediately prior to placement of the overlay onto a cake top; and FIG. 11 is a front perspective view showing the transfer of the overlay onto a cake top.

DETAILED DESCRIPTION OF THE PREFERRED EMBODIMENTS

Figure 3:
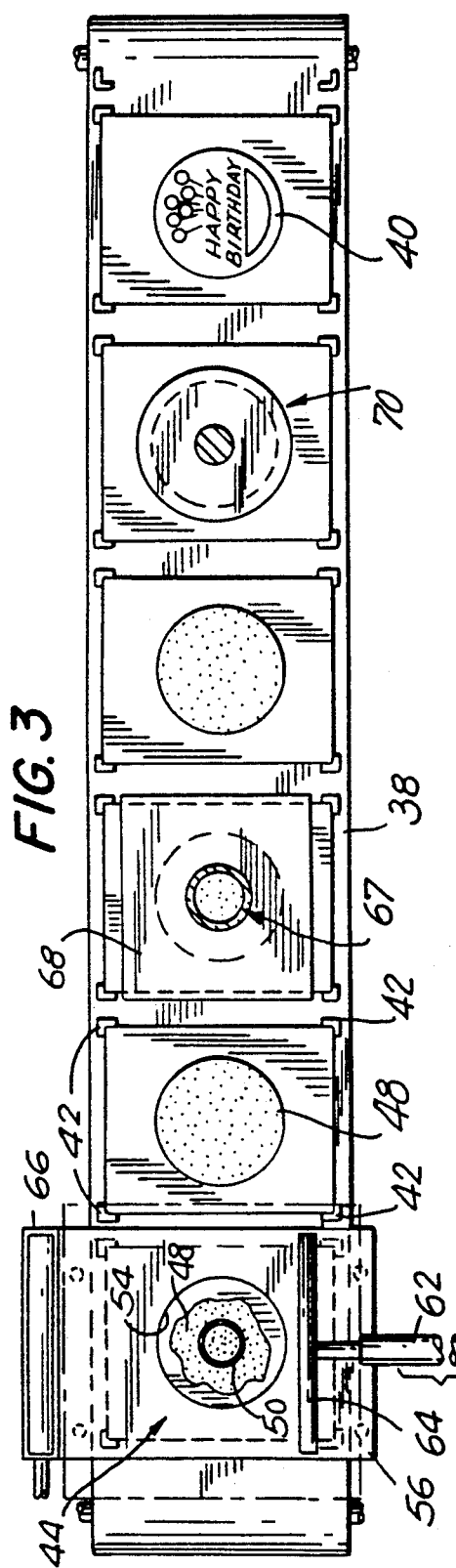
FIG. 3 is a top plan view of a downstream section of a production line operative for making an assembly for use in decorating a pastry according to the method of this invention.

Referring now to the drawings, a plurality of workstations are arranged in a row to form a production line for making a multitude of assemblies 10, a representative one being shown in FIG. 8.

Turning first to FIGS. 1 and 2, reference numeral 12 shows a belt conveyor operative for successively conveying along a feed direction a plurality of rigid, generally rectangular carrier sheets 14, each preferably constituted of cardboard, corrugated board or a heavy-duty backing paper. The carrier sheets 14 may be automatically or manually fed onto the conveyor 12.

The carrier sheets are conveyed to and past a first workstation 16 operative for applying a liquid adhesive to an upper surface of each carrier sheet. A gravity-fed reservoir 18 contains liquid adhesive 20 and feeds the adhesive over the outer surface of a transfer roller 22 which, in turn, is in rolling tangential contact with an applicator roller 24. The adhesive on the transfer roller 22 is transferred to the outer surface of the applicator roller 24 and, thereupon, to the upper surface of each carrier sheet due to the rolling tangential contact which the applicator roller 24 makes with each carrier sheet. Preferably, the adhesive is water based, non-toxic, and of the food-grade type approved for indirect contact with food. A hot wax adhesive can also be used. As shown in FIG. 1, the rollers 22, 24 extend transversely of the feed direction for a distance sufficient to cover the entire transverse width of each carrier sheet, thereby ensuring a uniform spread of adhesive over the entire upper surface area of each carrier.

The adhesive-coated carrier sheets are next conveyed to and past a second workstation 26 operative for supplying a flexible, sheet-like release film to and on each carrier sheet. A supply roll 28 of such release film in continuous coiled form feeds a leading end of the film between a pressure roller 30 and the upper surface of each adhesive-coated carrier sheet. The pressure roller 30 presses the release film onto each carrier sheet and prevents wrinkles from forming in the release film, and prevents air pockets or bubbles from forming between the release film and each carrier sheet. The pressure roller 30 also extends transversely over the entire width of the carrier sheets.

The film-adhered carrier sheets are next fed to and past a third workstation 32 operative for slitting the continuous release film 28 to be commensurate in area to that of the upper surface of each carrier sheet. A slitting knife 34 is reciprocally and automatically movable in a vertical direction, and severs the release film from the supply roll 28 so as to form individual, generally rectangular release films 36, one for each carrier sheet, as shown in FIG. 2. If desired, the carrier sheets can be fed through workstations 16 and 26 as a single rigid sheet, in which case, the knife 34 can also be used to cut through the single rigid sheet to form individual carrier sheets. The slitting knife 34 need not be automatically operated. It is also contemplated that the slitting procedure could also be performed manually.

The release film is a flexible sheet made of a synthetic plastic material. The release film is preferably not constituted of a single layer, but is a multi-layered coextruded film comprising a top layer of low-density polyethylene, a bottom layer of cast polypropylene, and a middle layer of polypropylene. A release agent is incorporated within the co-extruded film. The release film is commercially available as film stock No. CZ2281 from Advanced Film Technologies Corporation of Texas, a division of James River Corporation.

Figure 4:
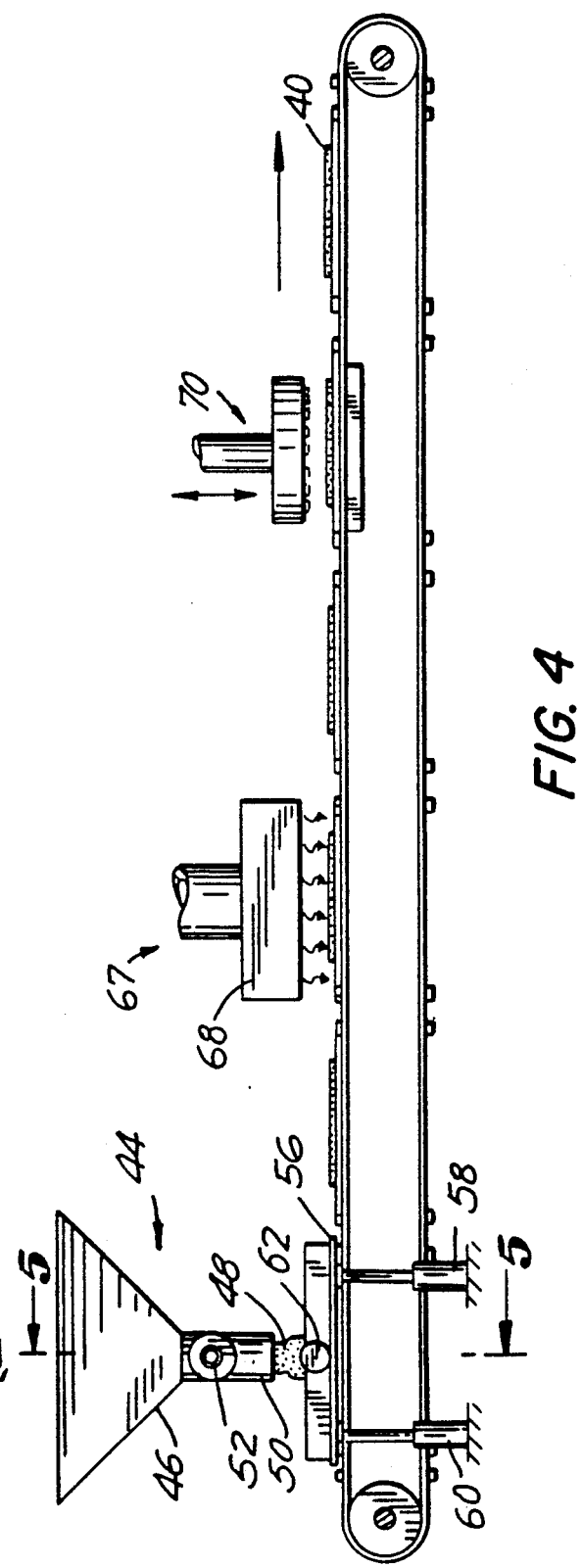
FIG. 4 is a side view of the arrangement of FIG. 3.

Turning now to FIGS. 3 and 4, another belt conveyor 38 is operative for successively and intermittently conveying along a feed direction the film-adhered carrier sheets past another plurality of workstations for forming an edible, decorative overlay 40 (see FIG. 8). As shown in FIG. 3, the conveyor 38 has multiple sets of locating fixtures 42, each arranged at the four corners of each rectangular carrier sheet. Each carrier sheet is snugly held in a fixed position relative to the conveyor 38 by the locating fixtures 42 by means of a friction fit, thereby ensuring proper registration of each carrier sheet in each workstation.

Workstation 44 is operative for initially forming the overlay 40 in situ on the release film registered in that workstation. A hopper 46 holds a flowable mass 48 comprised of four parts of a marshmallow mixture, five parts of icing sugar, and 2% by weight of glycerine to render the overlay less brittle. The marshmallow mixture is an aerated mixture consisting essentially of water, gelatin, sugar and corn syrup. The mixture is heated to ensure that the sugar and corn syrup are dissolved in the water and, after mixing with the gelatin, or perhaps albumen, or both, the entire mixture is whipped and aerated in a mixer to the desired volume and consistency.

Figure 5:
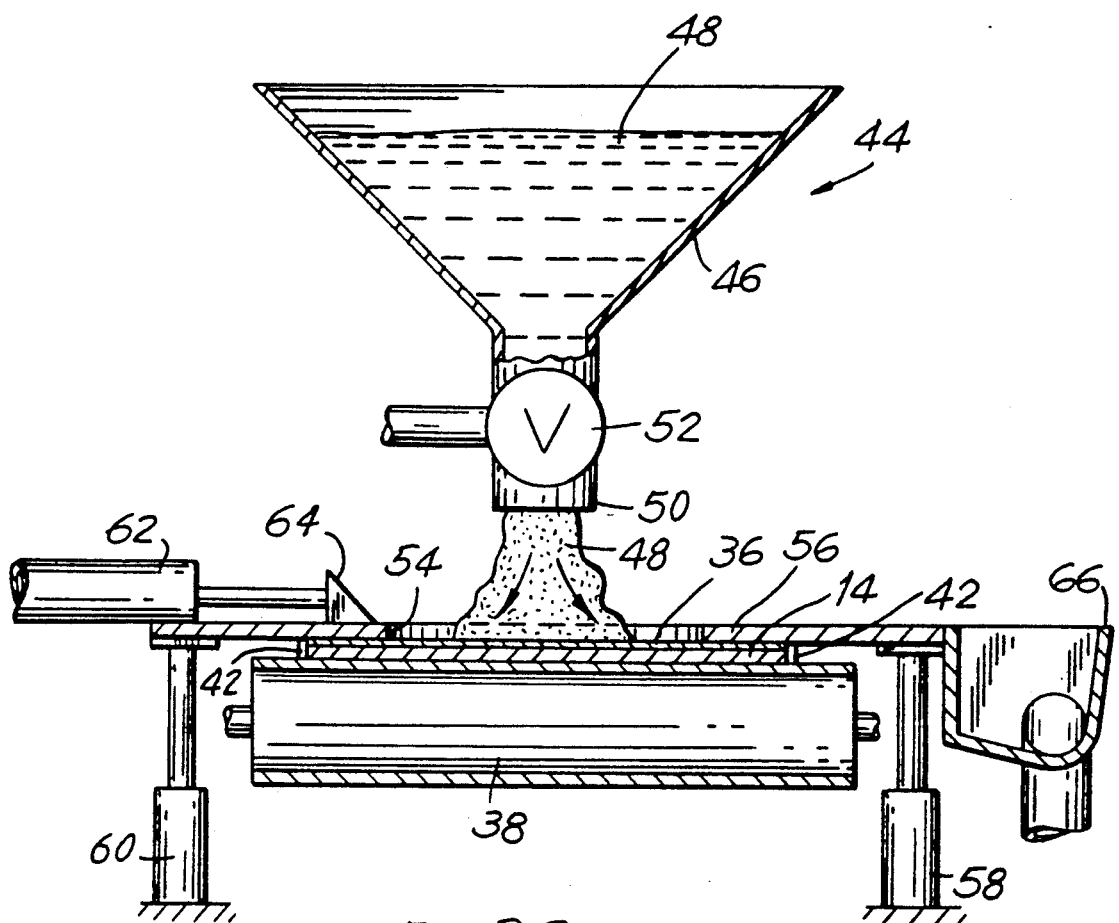
FIG. 5 is an enlarged sectional view taken on line 5—5 of FIG. 4, showing an initial stage of forming an overlay on a release film.
Figure 6:
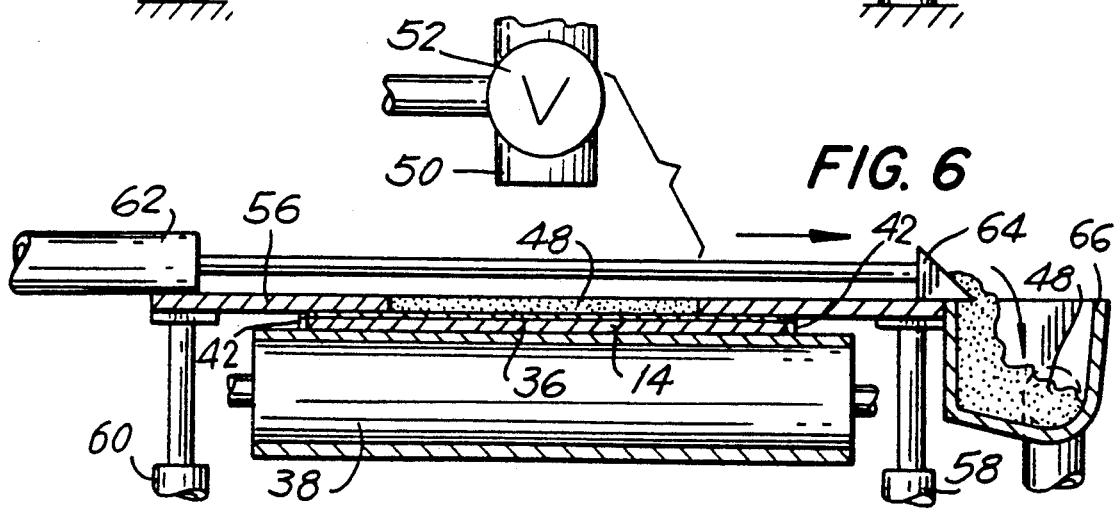
FIG. 6 is a view analogous to FIG. 5, but of a subsequent stage of forming the overlay on the release film.

As best shown in FIGS. 5-7, the mass 48 in the hopper 46 flows by gravity through a neck 50 in which a solenoid valve 52 is opened and closed for controlling a predetermined amount of the mass to be deposited onto the release film 36 which is adhesively secured to the carrier sheet 14 registered by locating fixtures 42 in the workstation 44.

As shown in FIG. 5, the opened valve 52 allows the mass 48 to descend and pass through an aperture 54 formed in a predetermined pattern in a stencil 56. The stencil 56 is positioned on top of the film-adhered carrier sheet registered in the workstation 44 by a pair of pistons of hydraulic cylinder-piston units 58,60 operative for raising and lowering the stencil 56. The conveyor 38 is intermittently driven and, during an initial stage of operation, i.e. when the valve 52 is opened, the conveyor 38 is stopped, and the units 58, 60 are actuated to lower the stencil onto the release film of the registered carrier sheet.

Another hydraulic cylinder-piston unit 62 is mounted at one side of the stencil 56 for joint movement therewith. A scraper blade 64 is mounted to an outer end of the piston of the unit 62, and is extendible and retractable upon activation of the unit 62. A trough 66 is also mounted on the stencil 56 for joint movement therewith. When the valve 52 is opened as shown in FIG. 5, the scraper blade 64 is retracted and positioned away from the aperture 54. The aperture 54 may be of any desired shape or pattern. As illustrated, the aperture 54 is shaped as a circle so that the resulting overlay 40 is formed as a circular disc for decorating the top of a round cake. Other patterns are, of course, contemplated by this invention. As shown in FIG. 6, after the valve 52 has been closed, the unit 62 is actuated, thereby extending the blade 64 to pass over the upper surface of the stencil 56 and past the aperture 54. The moving blade 64 acts to fill completely the aperture 54 with the mass 48. Excess material not filling the aperture is pushed into and collected by the trough 66 situated at the end of the stroke of the scraper blade 64. The conveyor 38 still has not advanced along the feed direction during this time. The units 58, 60 still maintain the stencil 56 in the lowered position. The fixtures 42 maintain the registered carrier sheet now also supporting the mass 48 in a fixed position.

As shown in FIG. 7, after elapse of a predetermined time sufficient to allow the mass 48 in the overlay to at least partially harden and set, the unit 62 is actuated to retract the blade 64. The units 58, 60 are also actuated to raise the stencil 56, as well as the unit 62 and the trough 66, above the carrier sheet 14. The circular disc 40 is now sufficiently hardened so that it will not flow or spread outwardly, at least not to any appreciable extent, when no longer confined within the aperture 54. The conveyor 38 is now ready to advance the disc-supporting carrier sheet to the next workstation.

Returning to FIG. 4, the next workstation 67 includes a dryer 68 operative for drying the disc 40 and hastening its hardening. The dryer 68 can include a heater, an air blower, an ultraviolet lamp, or any analogous dryer. The fixtures 42 continue to maintain the disc-supporting carrier sheet registered in the dryer. Drying continues until the conveyor 38 is once again advanced.

Once hardened, the disc strongly clings to the release film due, in large part, to the sticky nature of the sugar and corn syrup in the mass. Once dried, or at least until a skin forms on the upper surface of the mass, the mass is ready to be overprinted. A printing station 70, and preferably a plurality of such printing stations, are arranged downstream of the dryer 68. Each printing station 70 applies a different colored design or portion of a design to the upper surface of the mass registered therein. Edible colored inks, such as food colorings, are used. The locating fixtures 42 are particularly important in the multiple printing operations because they ensure that each circular mass is properly registered with each printing station. The conveyor stops for each printing operation in each printing station.

The resulting composite of a rigid carrier sheet 14, a release film 36 adhesively secured to the carrier sheet 14 by adhesive layer 20, and an edible, hardenable, decorative overlay 40 which self-clings to the film 36 once hardened is thereupon inserted as a unitary assembly into a package comprising an insert 72 having a circular cutout 74 and a transparent outer envelope or wrapper 76. Once fully inserted into the package, the overlay 40 is visible through the cutout 74. Graphics are printed on the insert 72 to complement the design on the overlay.

As shown in FIG. 8, the design on the overlay includes a graphic depiction of a set of balloons, words such as "Happy Birthday", and an empty space 78 in which words such as a person's name can be inscribed, e.g. see FIG. 9, for personalizing the design. Of course, any depiction of persons, animals, or things, including cartoon characters and/or any alpha-numeric characters, can be incorporated in the overlay 40.

In order to transfer the overlay 40 from the composite assembly to a pastry such as a cake top (see FIG. 11), the assembly must first be removed from the package wrapper 76. Thereupon, the release film and the overlay are initially peeled together as a unit from the carrier sheet 14. The adhesive bond formed by the adhesive layer 20 is strong enough to hold the film and the clinging overlay thereon, but is easily overcome when a user peels the release film with the overlay thereon from the carrier sheet by exerting modest pulling force. Thereupon, as shown in FIG. 10, the release film is peeled from the overlay. The overlay 40 can now be transferred by itself to a cake 80 to decorate the same as shown in FIG. 11. In some cases, it may be desirable to dampen the back of the overlay with water to facilitate the softening process and the incorporation of the overlay into the body of the cake.

The overlay 40 cannot be peeled from the release film, at least not without damaging the overlay. As previously mentioned, the only reliable way to remove the overlay from the assembly is first to peel the release film and the overlay together from the carrier sheet, and then to peel the release film from the overlay. The overlay is thus reliably prevented from being moved or shifted during its formation and during the manufacture and packing of the assembly, as well as during subsequent transport and handling. In addition, the overlay is easily removed from the assembly even by an unskilled user.

The carrier sheet thus performs many functions. Due to its rigid nature, the carrier sheet protects the more fragile overlay, not only during manufacture, but also during transport and eventual handling by the user. The carrier sheet supports the overlay during manufacture and serves as a convenient pallet to support the overlay during its passage through the various workstations comprising the production line. The carrier sheet has well-defined edges which cooperate with the locating fixtures to precisely register the overlay in each workstation—a feature which is of particular importance when multiple printing stations are employed to print a multi-colored design on each overlay.

It will be understood that each of the elements described above, or two or more together, also may find a useful application in other types of constructions differing from the types described above.

While the invention has been illustrated and described as embodied in an arrangement for and method of making and using an assembly for decorating pastries, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and scope of equivalence of the following claims.

What is claimed as new and desired to be protected by Letters Patent is set forth in the appended claims.

We claim:

1. A method of making and using an assembly including an edible, transferrable, hardenable, sheet-like, decorative overlay for decorating a pastry, comprising the sequential steps of:
    (a) providing a flat, rigid carrier sheet having an upper surface;
    (b) mounting a flexible, sheet-like, plastic release film on the carrier sheet by an adhesive bond by applying a sheet-like adhesive layer entirely over the upper surface of the carrier sheet and pressing the release film entirely over, and in surface contact with, the adhesive layer;
    (c) forming said edible, transferrable, hardenable, sheet-like, decorative overlay in situ on the release film, by associating a fluid mixture with said release film and allowing said fluid mixture to harden to form said overlay such that said hardened, sheet-like, decorative overlay clings to, and is entirely in surface contact with, the release film upon hardening of the overlay, said carrier sheet being of sufficient rigidity to protect said hardened overlay during transport and handling, and said adhesive bond formed by said adhesive layer being sufficient such that it holds said plastic release film and said clinging overlay on said carrier sheet but is easily overcome when a user peels said release film with said overlay thereon from said carrier sheet by exerting a pulling force, said plastic release film being such that it allows a user to peel said film from said overlay after said film has been peeled from said carrier sheet without damaging said overlay;
    (d) then peeling the release film and the clinging overlay together as a unit from the carrier sheet by successively breaking surface contact between the release film and the carrier sheet;
    (e) subsequently peeling the release film from the overlay by successively breaking surface contact between the release film and the overlay; and
    (f) then transferring the separated overlay itself to the pastry to decorate the same.

2. The method according to claim 1, wherein the forming step includes positioning a stencil on the release film, pouring the fluid mixture into the stencil, and removing the stencil from the release film after elapse of a predetermined time sufficient to allow the fluid mixture to at least partially harden.

3. The method according to claim 2, wherein the stencil has a patterned aperture, and wherein the pouring step overfills the aperture, and wherein the forming step includes scraping excess fluid mixture from the aperture.

4. The method according to claim 1; and further comprising the step of printing edible inks in a predetermined design on the hardened overlay.

5. The method, according to claim 4; and further comprising, after step (c) and before step (d), placing the printed overlay in a package having an opening through which the design is visible.

6. The method according to claim 1, wherein the providing, mounting and forming steps are performed on a mass-production basis; and wherein the providing step is performed by conveying a succession of carrier sheets along a feed direction past multiple workstations; and wherein the mounting step is performed by unrolling a continuous roll of film material onto the succession of carrier sheets and by cutting the film material to form a succession of release films each mounted on a respective carrier sheet; and wherein the forming step is performed at a forming workstation operative for forming an overlay on each release film.

7. The method according to claim 6, and further comprising the step of registering each carrier sheet at each workstation.

8. The method according to claim 6, and further comprising the steps of drying each overlay, printing a design on each overlay with edible inks, and wrapping each printed design in a package.

9. The method according to claim 1, wherein the fluid mixture consists essentially of an aerated mixture of water, gelatin, sugar, corn syrup, icing sugar and glycerine.

10. The method according to claim 1, wherein the fluid mixture consists of a marshmallow-based mixture of glycerine to extend the shelf life.

* * * * *